UNITED STATES PATENT OFFICE.

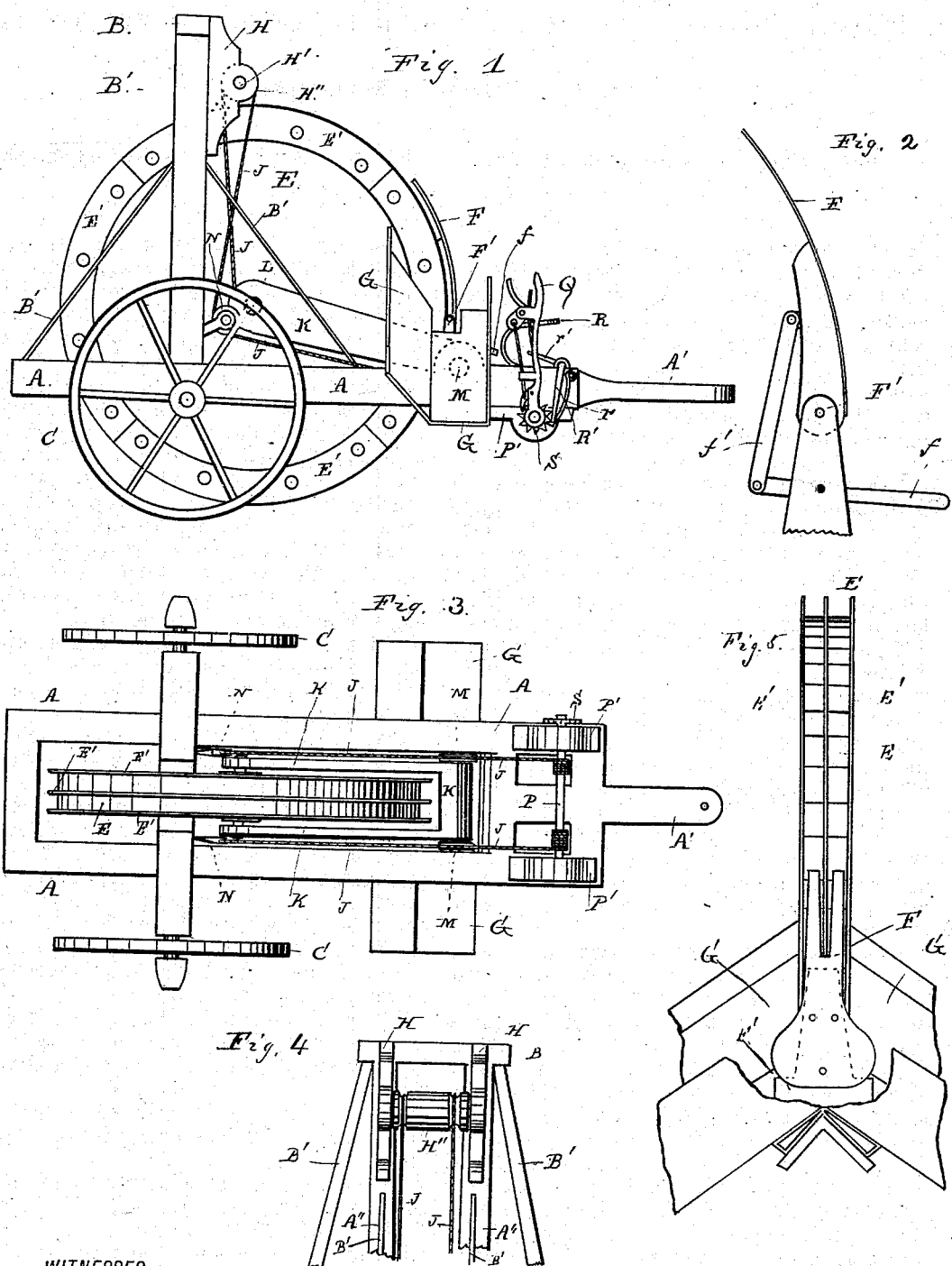

GEORGE L. HOEHN AND FRANK P. HILBURN, OF MOUNT VERNON, IND.

TILE-DITCHING MACHINE.

SPECIFICATION forming part of Letters Patent No. 291,511, dated January 8, 1884.

Application filed August 31, 1883. (No model.)

*To all whom it may concern:*

Be it known that we, GEORGE L. HOEHN and FRANK P. HILBURN, citizens of the United States, residing at Mount Vernon, in the county of Posey and State of Indiana, have invented certain new and useful Improvements in Tile-Ditching Machines, of which the following is a specification, reference being had therein to the accompanying drawings.

This invention relates to improvements in tile-ditching machines, and has for its object to cut a ditch and elevate the earth therefrom, and to discharge it on each side thereof. These objects are attained by the mechanism illustrated in the accompanying drawings, forming a part of this specification, in which—

Figure 1 is a side elevation. Fig. 2 is a detailed view of the scraper. Fig. 3 is a plan view from the bottom. Fig. 4 is a detail view of part of the frame and roller H″. Fig. 5 is a detached view of the scraper F, taken from the front of the machine, and also shows parts of wheel E, knives E′, and of the chute G.

The letter A indicates the frame of the machine; A′, the pole; A″, an upright frame; B, a cross-piece, forming part of the frame, and connecting the two uprights A″ to each other; B′, braces; C, the wheels; D, the driver's seat.

E is the ditching-wheel, which is preferably made about eight feet in diameter and about eight inches in width, and has two or more knives, E′, encircling it, made in sections, and which are fastened to the wheel E by bolts. The wheel E is made of iron, and should be of sufficient weight to sink the knives into the ground their full depth—say about five inches. This will fill the grooves formed by the knives with earth, and, as the wheel revolves, the earth which is retained by the steel knives E′ and the periphery of the wheel E is raised from the bottom of the ditch and carried to the bifurcated steel scraper F, by which it is scraped off, and thereby caused to drop on the chutes G, which carry it to each side of the ditch, where it falls upon the ground.

H are bearings attached to the upright frame A″ B, in which is journaled the shaft H′, which supports the roller H″, over which are extended ropes or chains J, the rear ends of which are attached to the bifurcated levers K, one arm of which is on each side of the wheel E, and by which it is supported by the shaft L, upon which it revolves. The bifurcated lever K is supported at its forward end by a shaft, M, having bearings in the frame A, and is raised and lowered, together with the wheel E, by means of the ropes or chains J, which pass over the roller H″; then downward under the pulleys N; then forward to the windlass P, which extends across the under side of the frame A, to which are attached the bearings P′. The windlass is operated by the ratchet-lever Q, having a stop, R′, having a spring, r, and a pedal, r′, by means of which it may be thrown out of gear by the foot of the driver, and when released it again engages with the ratchet-wheel s, and holds the windlass P in the desired position to operate the machine, or to suspend the wheel E above the surface of the ground when moving from place to place.

The scraper F is made either double or single, and is hinged at its lower extremity to a bearing just below the chute G. It is operated by means of a pitman, f′, extending from the rear of the scraper, to which it is pivoted, and the lever f, which is within reach of the hand of the driver, and by means of which he can cause the scraper to bear against the face of the wheel E in the grooves formed by the knives E′ in order to remove the earth therefrom or cause it to recede and to become inoperative.

The machine is intended to be coupled to the front wheels of any farm-wagon, said wheels being removed from the wagon for that purpose.

Having described our invention, what we claim, and desire to secure by Letters Patent, is—

In a tile-ditching machine, the frames A A″ B, the braces B′, the roller H″, the ropes J, the pulleys N, the bifurcated lever K, the windlass P, and wheel E, having knives E′, in combination with scraper F, having pitman f′, and lever f, substantially as described, and for the purposes set forth.

In testimony whereof we affix our signatures in presence of two witnesses.

GEORGE L. HOEHN.
FRANK. P. HILBURN.

Witnesses:
J. E. WOOD,
J. B. TATE.